United States Patent [19]
Ricks et al.

[11] Patent Number: 5,765,861
[45] Date of Patent: Jun. 16, 1998

[54] INTEGRAL STEERING WHEEL AND AIRBAG MODULE

[75] Inventors: Merle K. Ricks, Layton; Gary V. Adams, Brigham City; Joseph J. Mannino, Bloomfield Hills; Peter L. Vigeant, Canton, all of Mich.

[73] Assignees: Morton International, Inc., Chicago, Ill.; TG North America Corporation, Troy, Mich.

[21] Appl. No.: 695,870

[22] Filed: Aug. 12, 1996

[51] Int. Cl.⁶ .................................................. B60R 21/16
[52] U.S. Cl. ................................. 280/728.2; 280/731
[58] Field of Search ............................ 280/728.2, 731

[56] References Cited

U.S. PATENT DOCUMENTS

| | | | |
|---|---|---|---|
| 5,259,641 | 11/1993 | Schenk et al. | 280/731 |
| 5,308,107 | 5/1994 | Watanabe et al. | 280/728.2 |
| 5,501,484 | 3/1996 | Saderholm et al. | 280/728.2 |
| 5,584,501 | 12/1996 | Walters | 280/728.2 |
| 5,584,503 | 12/1996 | Lutz | 280/731 |

*Primary Examiner*—Paul N. Dickson

[57] ABSTRACT

The rim and spoke armatures of an automotive steering wheel are molded into a plastic body which presents to the driver an unbroken front surface. The plastic body of the steering wheel includes a cavity in its back surface which is closed by a hub plate attached to the steering column. The cavity and the hub plate serve as an airbag module and house the inflator and the folded airbag therein. The front surface of the steering wheel body may be scored, preferably on its hidden side, to form tear lines to release the expanding airbag.

8 Claims, 2 Drawing Sheets

INTEGRAL STEERING WHEEL AND AIRBAG MODULE

TECHNICAL FIELD

This invention relates to the field of vehicular airbags. More particularly, it relates to a steering wheel and driver's side airbag module integrated into a single unit.

BACKGROUND ART

Conventional driver's side airbag modules are separate units positioned in a recess in the front of the steering wheel. This creates a crack encircling the airbag module where it meets the remaining front surface of the steering wheel. This crack tends to collect dust and is aesthetically undesirable. It would be preferable for the steering wheel to present to the driver a substantially unbroken surface.

One means of overcoming this problem is described in European Patent Publication No. EP 0 648 661 A1, published Apr. 19, 1995. That publication discloses a steering wheel having an unseamed front surface on a body which is integral with the steering wheel rim. The rim portion is connected to elongated spokes which engage the steering wheel mounting hub. The airbag module is connected to the central body of the steering wheel and is also connected by screws to the elongated spokes. Accordingly, in order to service or replace the airbag module, it is necessary to remove the screws which interconnect the module with the spokes, then remove the screws which connect the rim and the central body to the spokes. This allows the main body of the steering wheel and the connected airbag module to be removed. It is then necessary to remove the module from the central body of the steering wheel. This results in an undesirable amount of labor and resulting expense which it would be desirable to eliminate.

Accordingly, it is a primary object of the present invention to provide a steering wheel in the form of a molded body having an unbroken front surface which can be removed in one operation to expose the airbag module. Other objects, features, and advantages will become apparent from the following description and appended claims.

DISCLOSURE OF INVENTION

The invention comprises a steering wheel in the form of a molded body which encloses the steering wheel rim and spokes. The molded body defines a cavity which is positioned on a hub plate connected to the steering shaft. The cavity serves as the airbag module, housing both the folded airbag and the inflator.

BEST MODE FOR CARRYING OUT THE INVENTION

Figure 1:
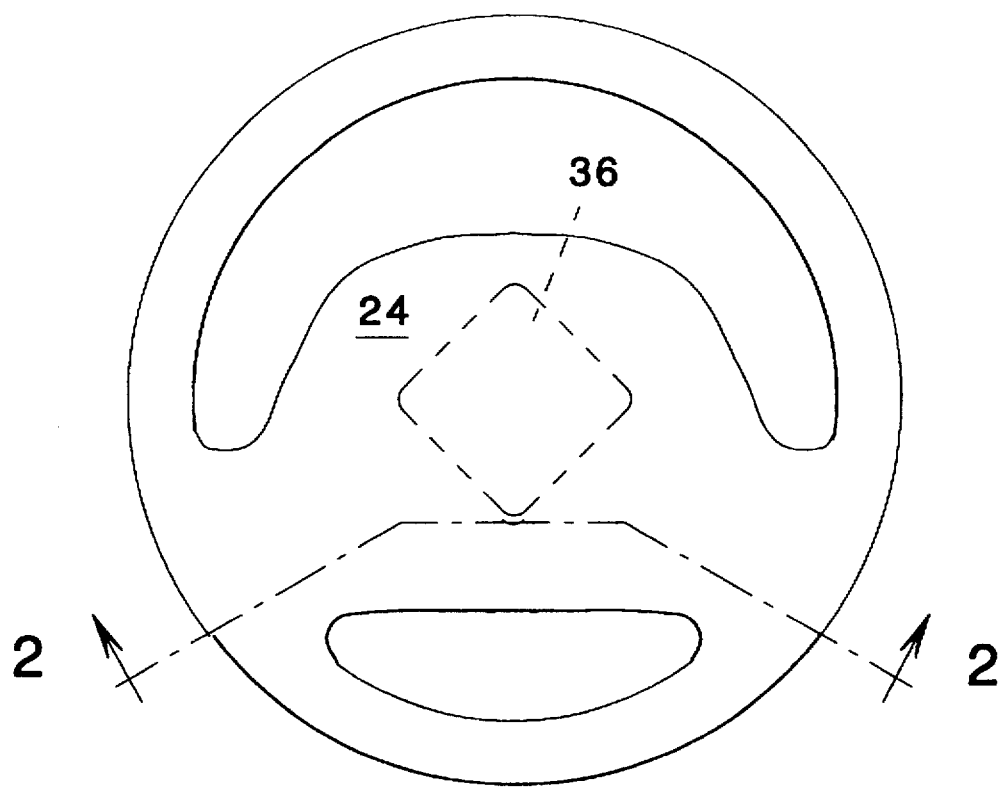
FIG. 1 is a front, or driver's side, view of a steering wheel and airbag module in accordance with the present invention.
Figure 2:
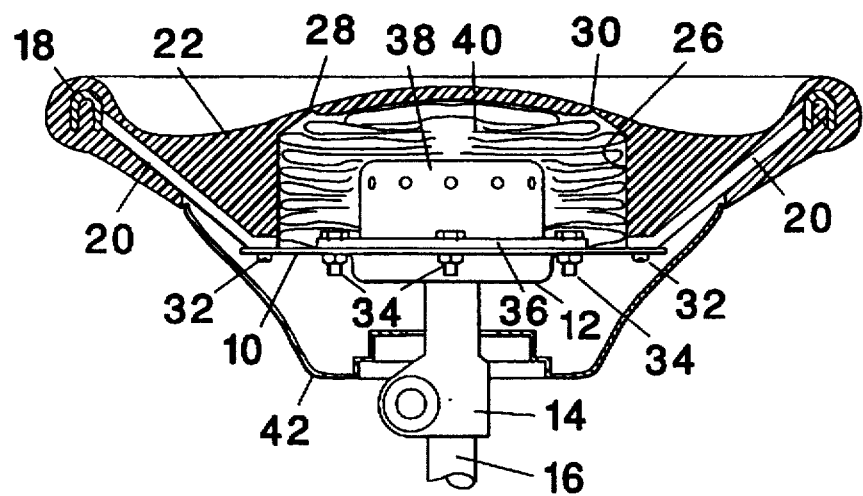
FIG. 2 is a cross-section taken substantially along the line 2—2 of FIG. 1.

In accordance with the present invention, a hub plate 10 having a depressed central region 12 is mounted on a hub 14 which is secured to the end of a steering column 16 by conventional means. A steering wheel in the form of a rim armature 18 mounted to one end of one or more spoke armatures 20 molded integrally into a plastic body 22 provides an unbroken surface 24 as shown in FIG. 1. The body 22 is formed with an internal cavity 26. The front surface of the body 22 overlying the cavity 26 is thinned on the cavity side to form one or more tearlines 28, 30 which are designed to burst open in a conventional manner to release the airbag upon activation. The steering wheel is mounted to the hub plate 10 by fastening means such as screws 32 which extend through the hub plate 10 and into the spoke armatures 20. When so mounted, the spoke armatures 20 extend radially outward from the hub plate and the rim armature is located in a plane spaced from the hub plate 10 in a direction away from the steering column 16. Also releasably secured on the hub plate 10 by means of nuts and bolts 34 is an encircling mounting flange 36 of a conventional inflator 38. The inflator 38 also extends downwardly into the depressed central region 12, of the hub plate. The cavity 26 also encloses a folded airbag 40. Thus it will be seen that the disclosed integral steering wheel in and of itself becomes the airbag module.

When the airbag or its inflator are to be serviced or replaced, it is merely necessary to remove the screws 32 thereby allowing the steering wheel to be removed and completely revealing the airbag and inflator. A shroud 42 which is often present at the back of the wheel may either be removed or provided with access openings for reaching the screws 32.

Figure 3:
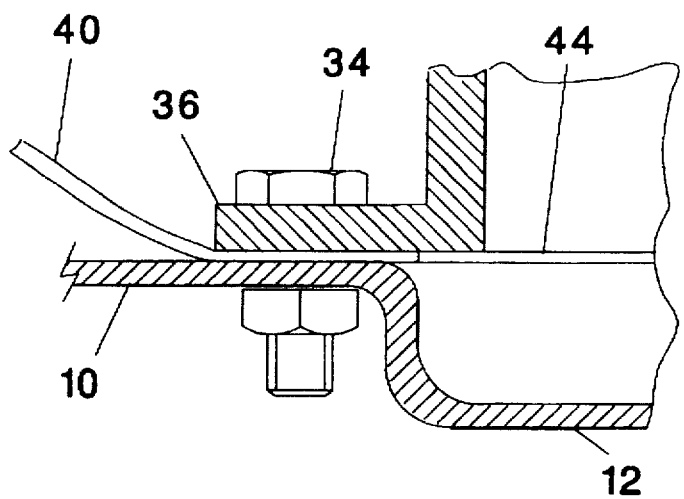
FIG. 3 is an enlarged partial cross-section illustrating one way of retaining the airbag within the steering wheel.

As the airbag module of this invention does not have a separate housing apart from the steering wheel itself, it is possible to achieve a simplified construction in the manner of installing the airbag. The airbag 40 has a conventional round mouth 44 formed therein. The peripheral region surrounding this mouth may be mounted between the mounting flange 36 of the inflator and the hub plate 10. This is illustrated in the enlarged detail view of FIG. 3. As will be seen therein, the fabric of the airbag 40 which surrounds the mouth 44 is positioned between the flange 36 of the inflator and the hub plate 10. In this position it is pinched and retained by the nuts and bolts 34 which serve to simultaneously mount the airbag and the inflator on the hub plate, thus achieving an economy of parts and installation labor.

Figure 4:
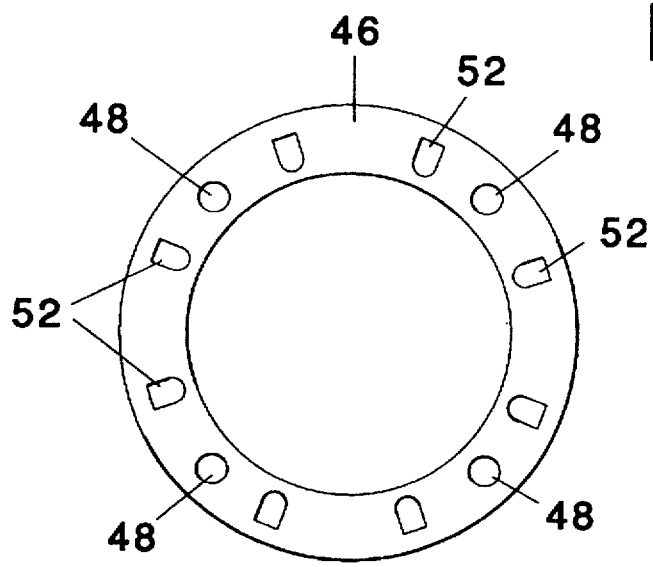
FIG. 4 is a plan view of an airbag retainer ring usable in the present invention.
Figure 5:
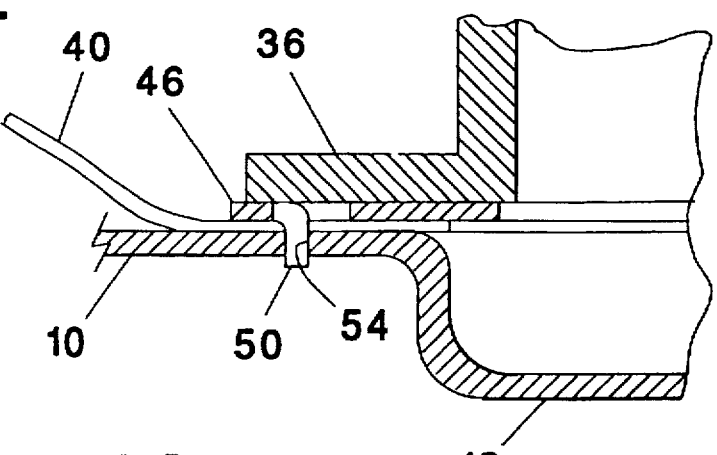
FIG. 5 is a view similar to FIG. 3 showing the manner of installing the retainer ring of FIG. 3.

If it is deemed necessary to increase the friction retaining the mouth of the airbag 40, a retainer ring 46 of the type shown in FIG. 4 and disclosed and claimed in U.S. Pat. No. 5,443,284 may be employed. The illustrated ring has four mounting holes 48 for receiving the bolts 34 mounting the inflator 38 to the hub plate 10. It is also pierced by eight U-shaped cuts about its periphery. The material within each cut is bent downwardly to create eight tabs 50 depending from eight U-shaped openings 52. As illustrated in FIG. 5, the retaining ring is mounted atop the fabric of the airbag 40 surrounding its mouth 44. Suitable openings 54 are provided in the hub plate 10 to receive the tabs after they have pierced the fabric. If desired, the tabs may be longer and crimped below the hub plate for even more security. In addition to increasing retention force on the airbag, the retainer ring may be of a heat insulating material to help shield the airbag fabric from the intense heat generated by some inflator gas generants.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. An automotive steering wheel comprising:

a hub plate having a depressed central region and a hub mounted on and extending downwardly from said depressed central region, said hub connectable directly to a steering column and extending substantially radially outwardly therefrom;

a spoke armature having a first end directly connected to said hub plate and a second end positioned radially outwardly from said hub plate in a plane spaced from said hub plate in a direction away from said steering column;

a rim armature in said spaced plane secured to the second end of said spoke armature;

a one-piece molded plastic body integral with and enclosing said spoke and rim armatures and defining an internal cavity positioned over said hub plate when said spoke armature is connected directly to said hub plate;

an airbag inflator mounted on said hub plate in said depressed central region and within said internal cavity of the molded plastic body;

a folded airbag within said cavity, said airbag having a mouth positioned to receive inflating gas from said inflator; said inflator and airbag being fully exposed when said spoke armature is detached from said hub plate and said molded body is removed; and means releasably securing said spoke armature first end to said hub plate.

2. The steering wheel of claim 1 comprising:

a plurality of spoke armatures, each having a first end directly connected to said hub plate and a second end positioned radially outwardly from said hub plate; and wherein said rim armature is secured to the second end of each of said spoke armatures.

3. The steering wheel of claim 1 comprising:

an encircling mounting flange on said inflator;

the mouth of said airbag being positioned between said mounting flange and said hub plate; and means releasably securing said mounting flange on said hub plate and simultaneously securing the mouth of said airbag between said flange and said hub plate.

4. The steering wheel of claim 3 wherein said means releasably securing additionally comprises:

a retainer ring surrounding the mouth of said airbag intermediate said hub plate and said inflator flange; and means extending from said retainer ring for piercing the airbag at spaced positions around said mouth.

5. The steering wheel of claim 4 wherein said piercing means are received in aligned openings in said hub plate.

6. The steering wheel of claim 3 comprising:

a plurality of spoke armatures, each having a first end connectable to said hub plate and a second end positioned radially outwardly from said hub plate; and wherein said rim armature is secured to the second end of each of said spoke armatures.

7. The steering wheel of claim 4 comprising:

a plurality of spoke armatures, each having a first end connectable to said hub plate and a second end positioned radially outwardly from said hub plate; and wherein said rim armature is secured to the second end of each of said spoke armatures.

8. The steering wheel of claim 5 comprising:

a plurality of spoke armatures, each having a first end connected to said hub plate and a second end positioned radially outwardly from hub plate; and wherein said rim armature is secured to the second end of each of said spoke armatures.

* * * * *